US011493376B2

(12) United States Patent
Arai et al.

(10) Patent No.: US 11,493,376 B2
(45) Date of Patent: Nov. 8, 2022

(54) LEVEL INDICATOR WITH PROTECTIVE COVER

(71) Applicant: YOKOGAWA ELECTRIC CORPORATION, Tokyo (JP)

(72) Inventors: Takashi Arai, Tokyo (JP); Yusaku Yoshida, Tokyo (JP); Tomoyuki Takahashi, Tokyo (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/139,416

(22) Filed: Dec. 31, 2020

(65) Prior Publication Data

US 2021/0215526 A1 Jul. 15, 2021

(30) Foreign Application Priority Data

Jan. 10, 2020 (JP) .............................. JP2020-002669

(51) Int. Cl.
*G01F 23/14* (2006.01)
*G01F 23/18* (2006.01)
*G01F 23/16* (2006.01)

(52) U.S. Cl.
CPC ............ *G01F 23/18* (2013.01); *G01F 23/164* (2013.01)

(58) Field of Classification Search
CPC ........ G01F 23/14; G01F 23/16; G01F 23/161; G01F 23/162; G01F 23/164; G01F 23/165; G01F 23/167; G01F 23/168; G01F 23/18; G01F 23/185
See application file for complete search history.

(56) References Cited

U.S. PATENT DOCUMENTS

| 3,244,004 A | 4/1966 | Wigger | |
|---|---|---|---|
| 3,986,399 A * | 10/1976 | Satou | ................. G01L 19/0007 73/706 |
| 2004/0129086 A1 | 7/2004 | Binet et al. | |
| 2020/0011754 A1 * | 1/2020 | Aoyama | ................ B23K 35/32 |

FOREIGN PATENT DOCUMENTS

| CN | 104330197 A | | 2/2015 | |
|---|---|---|---|---|
| CN | 108534864 A | * | 9/2018 | |
| EP | 3358330 A2 | * | 8/2018 | ........... G01F 23/164 |
| EP | 3358330 A2 | | 8/2018 | |
| JP | H02-088922 A | | 3/1990 | |
| JP | H05-2046 U | | 1/1993 | |
| JP | H10-185650 A | | 7/1998 | |
| JP | 2000-097748 A | | 4/2000 | |
| JP | 2001208593 A | * | 8/2001 | |
| JP | 2001208593 A | | 8/2001 | |
| JP | 2008-96303 A | | 4/2008 | |
| JP | 2017133875 A | * | 8/2017 | |
| JP | 2019-039682 A | | 3/2019 | |
| KR | 101020073 B1 | * | 3/2011 | |
| KR | 101571553 B1 | * | 11/2015 | |

\* cited by examiner

*Primary Examiner* — Herbert K Roberts
(74) *Attorney, Agent, or Firm* — Osha Bergman Watanabe & Burton LLP

(57) ABSTRACT

A level indicator with a cover that measures a water level, includes: a water level indicator that measures pressure; and a protective cover that surrounds the water level indicator. The protective cover includes a pressure transmitter that transmits pressure on an outside of the protective cover to an inside of the protective cover.

8 Claims, 6 Drawing Sheets

LEVEL INDICATOR WITH PROTECTIVE COVER

BACKGROUND

Technical Field

The present invention generally relates to a level indicator with a cover, in particular, a water level indicator with a protective cover.

Related Art

The following patent literature 1 discloses a throw-in type water level indicator used in water and sewage, dams, seabeds, lake bottoms, sluice gate entrances, deep wells, reservoirs, small and medium rivers, waterways, and chemical plant process tanks. The throw-in type water level indicator is sunk in water and measures the pressure. Furthermore, the throw-in type water level indicator calculates the measured pressure, computes the water level, and outputs it.

PATENT LITERATURE

Patent Literature 1 JP 2008-96303 A

Incidentally, when a water level indicator is used in a corrosive fluid such as seawater, there is a risk that the casing of the water level indicator and a wetted part such as a metal diaphragm for receiving pressure may be corroded. Therefore, it is necessary to use expensive materials that are highly corrosion-resistant for the wetted part, such as titanium, for example, so costs become high. Furthermore, the water level indicator needs to be washed frequently, particularly when under water, due to the significant adhesion of organisms such as algae and shellfish. In addition, at the time of manufacture, it is necessary to separately create parts that are used and are not used in corrosive liquids, and thus control is also difficult.

SUMMARY

One or more embodiments provide a water level indicator capable of coping with corrosive fluid and from which removal of attached matter is facilitated.

One or more embodiments of the present invention adopt a water level indicator including a protective cover, provided with a water level indicator for measuring pressure and a protective cover for surrounding the water level indicator, wherein the protective cover includes a pressure transmission part (i.e., pressure transmitter) for transmitting pressure outside of the protective cover to the inside of the protective cover.

Furthermore, in one or more embodiments of the present invention, the inside of the protective cover may be filled using an incompressible fluid.

Furthermore, in one or more embodiments of the present invention, the protective cover includes a case surrounding the water level indicator, and the pressure transmission part may be formed of a diaphragm or a bellows which is softer than the case.

Furthermore, in one or more embodiments of the present invention, the case may be made of resin.

Furthermore, in one or more embodiments of the present invention, the case may be provided with a cylindrical body part surrounding the water level indicator, a first blocking part for blocking one end of the body part and through which a cable connected to the water level indicator passes, and a second blocking part for blocking the other end of the body part and to which the pressure transmission part is attached.

Furthermore, in one or more embodiments of the present invention, a protective cap for protecting the pressure transmission part may be mounted to the second blocking part.

Furthermore, in one or more embodiments of the present invention, a spacer for avoiding collision with the body part may be mounted to the water level indicator.

Furthermore, in one or more embodiments of the present invention, a groove or a hole through which fluid is passed through may be formed on the spacer.

According to one or more embodiments of the present invention, it is possible to cope with corrosive fluid and removal of attached matter is facilitated.

DETAILED DESCRIPTION

Embodiments of the present invention will be described herein with reference to the drawings. Those skilled in the art will recognize that many alternative embodiments can be accomplished using the teaching of the present invention and that the present invention is not limited to the embodiments illustrated herein for explanatory purposes.

First Embodiment

Figure 1:
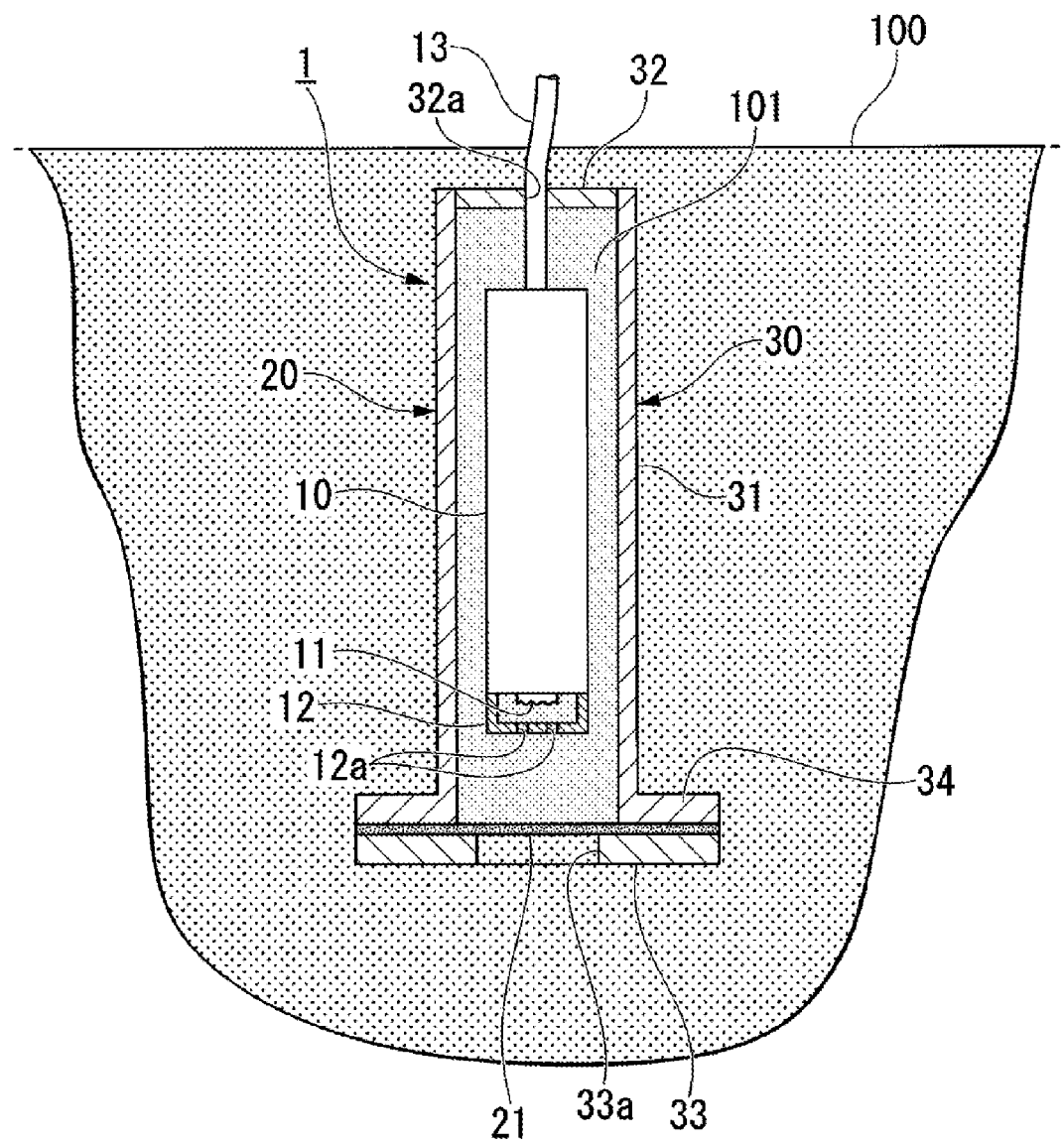
FIG. 1 is a configuration diagram of the water level indicator including a protective cover according to a first embodiment.

FIG. 1 is a configuration diagram of a level indicator with a cover 1 according to the first embodiment. The level indicator with the cover 1 may be referred to as a water level indicator (or water level gauge) with a protective cover.

The water level indicator with a cover 1 illustrated in FIG. 1 is sunk in a corrosive fluid 100 such as seawater and measures pressure. The water level indicator including a protective cover 1 may be used not only in seawater, but also in water and sewage, dams, lake bottoms, sluice gate entrances, deep wells, reservoirs, small and medium rivers, waterways, chemical plant process tanks, and the like.

The water level indicator with a protective cover 1 includes a water level indicator 10 and a protective cover 20. The water level indicator 10 is formed in a cylindrical shape. The water level indicator 10 includes a pressure measuring part 11 for measuring pressure and a protective cap 12 for protecting the pressure measuring part 11. A cable 13 is connected to the water level indicator 10. The cable 13 electrically connects the water level indicator 10 and an external device, which is not illustrated.

The pressure measuring part 11 is formed of, for example, a metal diaphragm. The water level indicator 10 converts the displacement of the pressure measuring part 11 receiving pressure into an electric signal and outputs it to the external device through the cable 13. Calculation from pressure to water level may be performed by a calculation part inside the water level indicator 10, or it may be performed by a calculation part of the external device.

The pressure measuring part 11 is disposed at a lower end of the water level indicator 10. The protective cap 12 surrounds the pressure measuring part 11 at the lower end of the water level indicator 10. A plurality of small holes 12a through which fluid is passed through is formed on the protective cap 12. The cable 13 is connected to an upper end of the water level indicator 10.

The protective cover 20 surrounds the entirety of the water level indicator 10. The protective cover 20 includes a pressure transmission part 21 for transmitting pressure from outside (corrosive fluid 100) of the protective cover 20 to the inside of the protective cover 20. The inside of the protective cover 20 is filled using an incompressible fluid 101. A non-corrosive fluid which does not corrode a metal, such as water or silicon oil, may be the incompressible fluid 101.

The pressure transmission part 21 illustrated in FIG. 1 is formed of a rubber diaphragm. When the pressure transmission part 21 receives pressure from outside of the protective cover 20 and, for example, bends toward the inside of the protective cover 20, the incompressible fluid 101 is compressed and the pressure inside the protective cover 20 rises. Thus, the water level indicator 10 may measure the pressure of outside of the protective cover 20 while in the protective cover 20.

The protective cover 20 includes a case 30 made of resin. The case 30 is formed of, for example, polyvinyl chloride (so-called polyvinyl chloride pipe or polyvinyl chloride flange) harder than the pressure transmission part 21. The resin material is lower in cost than metal and is easily available in the market, so the cost of the protective cover 20 may be reduced significantly.

The protective cover 20 may be applied with a coating material for preventing the adhesion of organisms such as algae and shellfish. A coating material that is a self-consumable and hydrolyzable copper-acrylic system, a zinc-acrylic system, a silicon system, or the like used as a marine coating material may be used as the coating material applied to the protective cover 20. Note that when the adhesion of organisms such as algae and shellfish is significant and thus washing is difficult, the protective cover 20 may be discarded and replaced with a new protective cover 20.

The case 30 includes a cylindrical body part 31 surrounding the water level indicator 10, a first blocking part 32 for blocking the upper end (one end) of the body part 31, and a second blocking part 33 for blocking the other end (lower end) of the body part 31. An insertion hole 32a through which the cable 13 connected to the water level indicator 10 passes is formed on the first blocking part 32. The second blocking part 33 includes the pressure transmission part 21 described above.

The second blocking part 33 is fixed to a flange part 34 provided at the lower end of the body part 31. The pressure transmission part 21 is interposed between the second blocking part 33 and the flange part 34. An opening part 33a by which the pressure transmission part 21 is exposed is formed at a center portion of the second blocking part 33. The pressure transmission part 21 contacts the corrosive fluid 100 through the opening part 33a.

According to the level indicator with the cover 1 having the foregoing configuration, the water level indicator 10 contacts only the incompressible fluid 101 which does not corrode a metal, such as water or silicone oil, and the pressure outside of the protective cover 20 is introduced through the pressure transmission part 21. Therefore, a wetted part such as the pressure measuring part 11 or the casing of the water level indicator 10 does not contact the corrosive fluid 100 and is not affected by corrosion.

Accordingly, pressure may be measured without using an expensive material such as titanium for the wetted part of the water level indicator 10. Furthermore, since the water level indicator 10 itself has the same configuration as a conventional one, it is not necessary to create separate parts, and thus control becomes simple. Moreover, maintenance with respect to organism adhesion may be completed by simply cleaning or replacing the pressure transmission part 21.

According to one or more embodiments described above, adopting a configuration in this way which provides the water level indicator 10 for measuring pressure and the protective cover 20 for surrounding the water level indicator 10, wherein the protective cover 20 includes the pressure transmission part 21 for transmitting pressure from outside of the protective cover 20 to the inside of the protective cover 20, makes it possible to obtain the level indicator including the cover 1, which is capable of coping with corrosive fluid and from which removal of attached matter is facilitated.

Furthermore, in one or more embodiments, since the inside of the protective cover 20 is filled using the incompressible fluid 101, lowering of sensitivity of the water level indicator 10 may be suppressed.

Furthermore, in one or more embodiments, the protective cover 20 includes the case 30 for surrounding the water level indicator 10, and the pressure transmission part 21 is formed of a diaphragm which is softer than the case 30. According to this configuration, the hard case 30 makes it possible to transmit pressure on the outside to the inside through the soft diaphragm while protecting the water level indicator 10 from foreign matter or the like floating outside of the protective cover 20.

Furthermore, in one or more embodiments, since the case 30 is made of resin, the cost of the protective cover 20 may be reduced significantly. Furthermore, costs may be further reduced by additionally constructing and using a standard vinyl chloride pipe for the body part 31 and a standard vinyl chloride flange for the second blocking part 33.

Furthermore, in one or more embodiments, the case 30 includes the cylindrical body part 31 surrounding the water level indicator 10, the first blocking part 32 for blocking one end of the body part 31 and through which the cable 13 connected to the water level indicator 10 passes, and the second blocking part 33 for blocking the other end of the body part 31 and to which the pressure transmission part 21 is attached. According to this configuration, a portion through which the cable 13 passes and a portion for providing the pressure transmission part 21 are positioned on opposite sides—at one end and the other end of the body part 31—so that disposition and assembly are facilitated without interference from both.

Second Embodiment

Next, the second embodiment of the present invention will be described. In the following description, the same reference numerals are provided for the same or equivalent configuration as the above-described embodiments, and descriptions thereof will be simplified or omitted.

Figure 2:
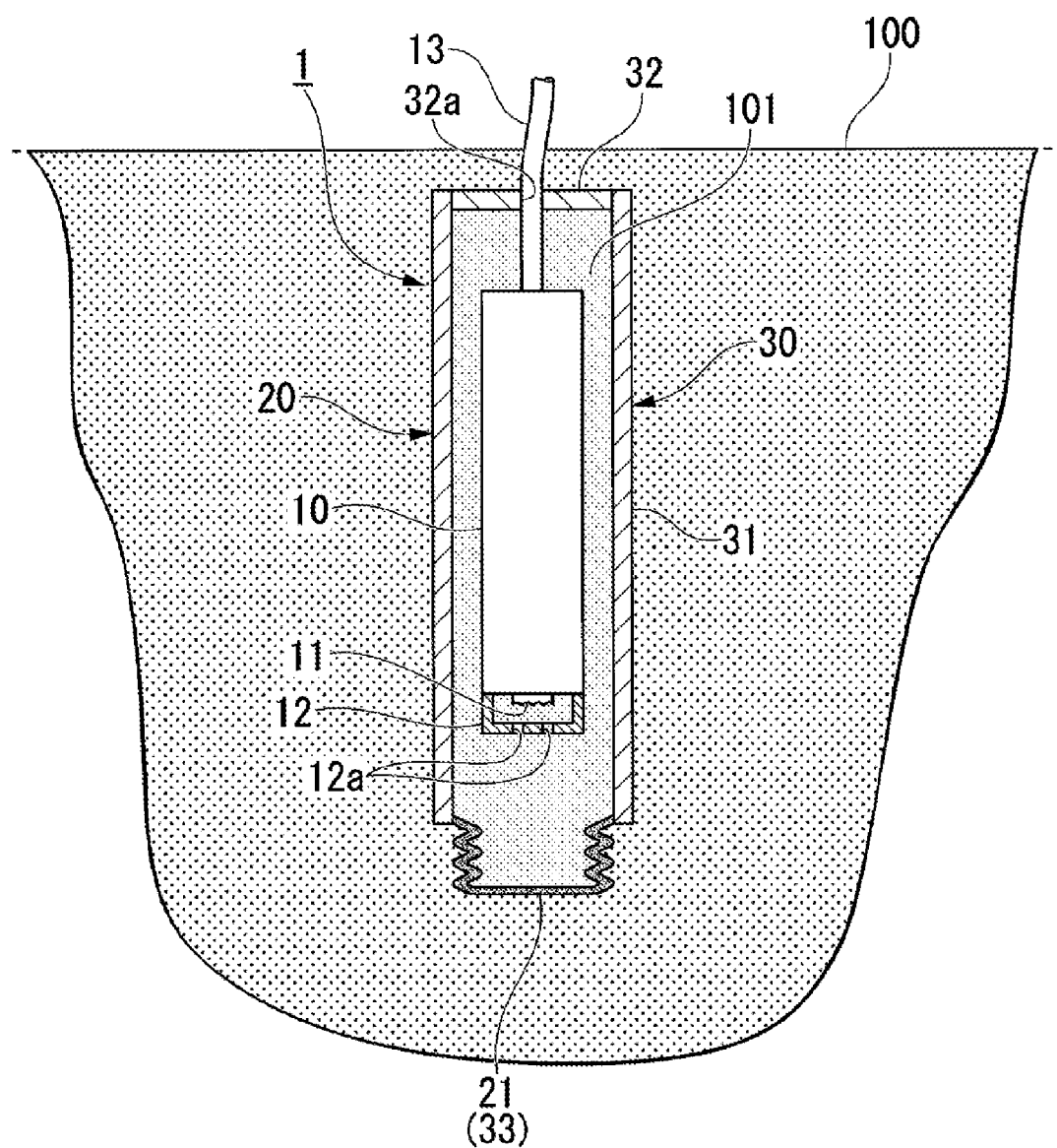
FIG. 2 is a configuration diagram of a water level indicator including a protective cover according to a second embodiment.

FIG. 2 is a configuration diagram of the water level indicator including a protective cover 1 according to the second embodiment.

The water level indicator including a protective cover 1 illustrated in FIG. 2 includes the pressure transmission part 21 formed of a bellows.

The pressure transmission part 21 is formed of a resin bellows. Note that the pressure transmission part 21 may be formed of a metal bellows having corrosion resistance. The pressure transmission part 21 is mounted so as to block the lower end of the body part 31. In other words, the pressure transmission part 21 is the second blocking part 33 for blocking the lower end of the body part 31.

When the pressure transmission part 21 receives pressure from outside (corrosive liquid 100) of the protective cover 20 and, for example, contracts toward the inside of the protective cover 20, the incompressible fluid 101 is compressed and the pressure inside the protective cover 20 rises. Thus, the water level indicator 10 may measure the pressure of outside of the protective cover 20 while in the protective cover 20.

According to the second embodiment, similar to the first embodiment described above, the water level indicator 10 contacts only the incompressible fluid 101 which does not corrode a metal, such as water or silicone oil, and the pressure outside of the protective cover 20 is introduced through the pressure transmission part 21. Therefore, the water level indicator 10 is not affected by corrosion or organism adhesion. Accordingly, it is possible to cope with corrosive fluid and removal of attached matter is facilitated.

Next, one or more embodiments of the present invention will be described. In the following description, the same reference numerals are provided for the same or equivalent configuration as the above-described embodiments, and descriptions thereof will be simplified or omitted.

Figure 3:
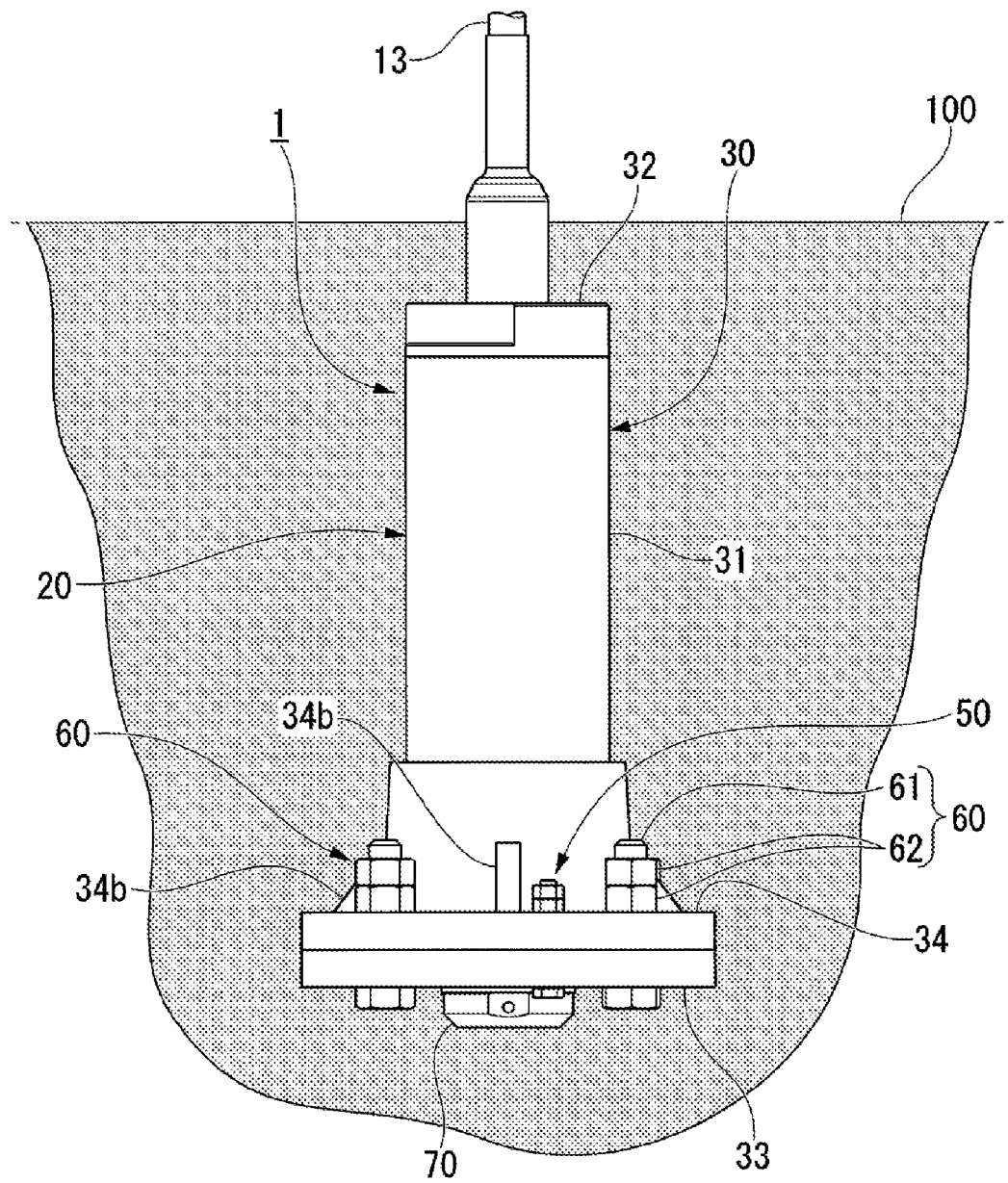
FIG. 3 is a front view of a water level indicator including a protective cover according to one or more embodiments.
Figure 4:
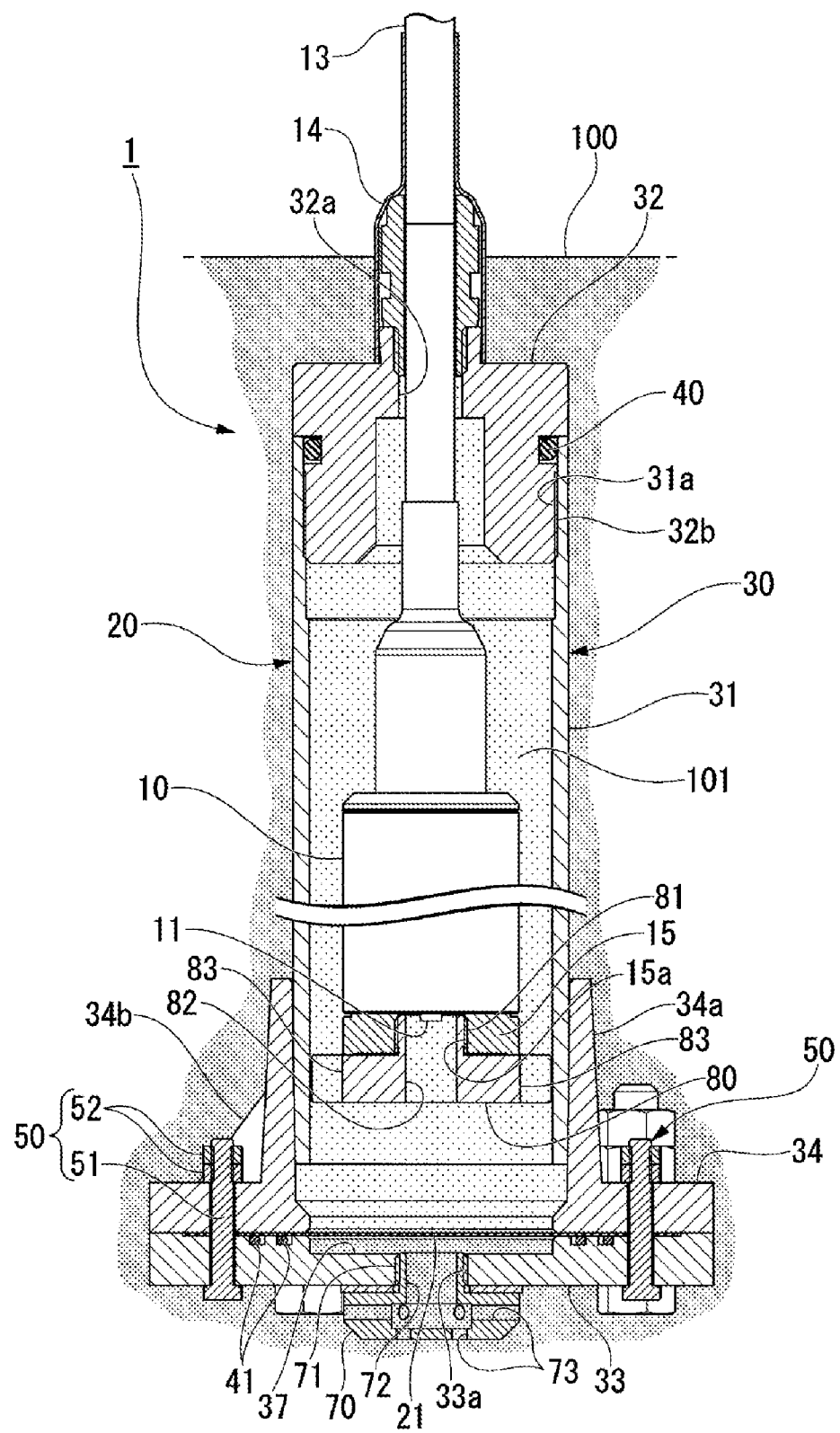
FIG. 4 is a cross-sectional configuration diagram of the water level indicator including a protective cover according to one or more embodiments.

FIG. 3 is a front view of the level indicator with the cover 1 according to one example. FIG. 4 is a cross-sectional configuration diagram of the level indicator with the cover 1 according to one example.

As illustrated in FIG. 4, the level indicator with the cover 1 includes the pressure transmission part 21 formed of a diaphragm. In other words, the level indicator with the cover 1 is one example of the water level indicator with the cover 1 of the first embodiment described above.

As illustrated in FIG. 4, the first blocking part 32 is screwed to the body part 31. A female screw 31a is formed on the inner wall surface at the upper end of the body part 31. A male screw 32b screwed to the female screw 31a is formed on the first blocking part 32. A seal ring 40 closely adhered to the inner wall surface of the body part 31 and sealing a gap between the first blocking part 32 and the body part 31 is disposed on the upper side of the male screw 32b.

A waterproof connector 14 is connected to the insertion hole 32a of the first blocking part 32. The cable 13 is drawn out to the outside of the protective cover 20 through the waterproof connector 14 connected to the insertion hole 32a.

The second blocking part 33 is fastened to the flange part 34 by a bolt. The flange part 34 is a separate part from the body part 31 and includes a cylindrical fitting part 34a fitted to the lower end of the body part 31. A reinforcing rib 34b is provided on the outer circumference of the fitting part 34a. The reinforcing rib 34b is provided in plurality at intervals in the circumferential direction of the fitting part 34a as illustrated in FIG. 3.

The second blocking part 33 and the flange part 34 are fixed by two kinds of fixing parts: a first fixing part 50 and a second fixing part 60. The first fixing part 50 is configured of a bolt 51 and a nut 52 having a small diameter as illustrated in FIG. 4. The first fixing part 50 also serves as the positioning of the pressure transmission part 21. The second fixing part 60 is configured of a bolt 61 and a nut 62 having a larger diameter than the first fixing part 50 as illustrated in FIG. 3.

Figure 5:
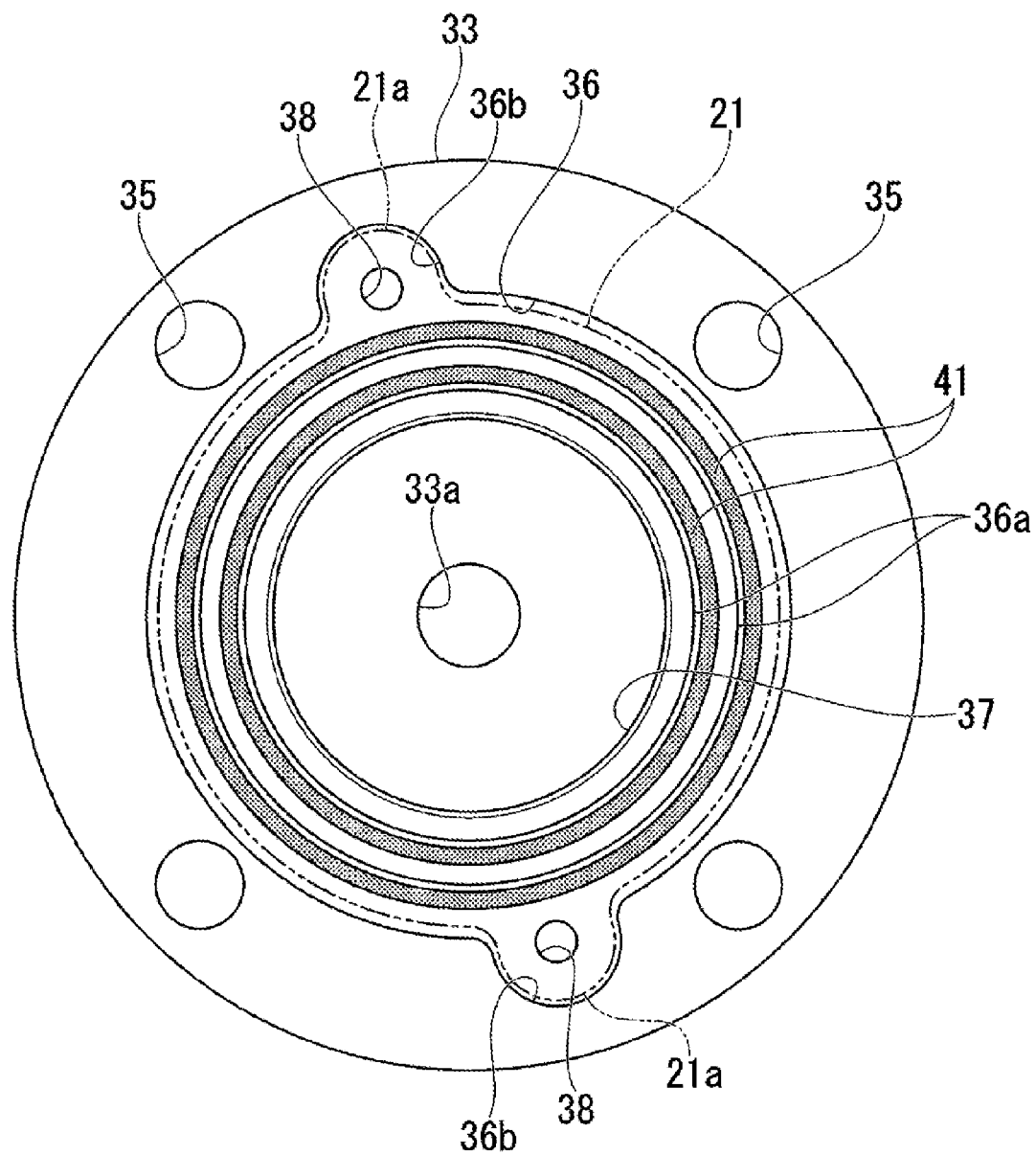
FIG. 5 is a plan view of a second blocking part according to one example.

FIG. 5 is a plan view of the second blocking part 33 according to one example.

As illustrated in FIG. 5, an insertion hole 35 through which the bolt 61 of the second fixing part 60 is inserted is formed on the second blocking part 33. The insertion hole 35 is formed in plurality at intervals in the circumferential direction on the outer circumferential edge of the second blocking part 33.

A first groove 36 for disposing the pressure transmission part 21 is formed further radially inward than the insertion hole 35 on the second blocking part 33. A plurality of annular grooves 36a is formed on the first groove 36, and a seal ring 41 is disposed on each annular groove 36a. The seal ring 41, as illustrated in FIG. 4, closely adheres to the pressure transmission part 21 by fastening and fixing the second blocking part 33 and the flange part 34, and seals a gap between the second blocking part 33 and the flange part 34.

Returning to FIG. 5, a positioning groove 36b is formed on the outer circumference of the first groove 36. The positioning groove 36b is disposed between the insertion holes 35 and formed in a pair on a diagonal line around the opening part 33a. The positioning groove 36b has a substantially semicircular shape extending radially outward from the outer circumference of the first groove 36.

A positioning part 21a provided on the pressure transmission part 21 is disposed on the positioning groove 36b. Furthermore, a positioning hole 38 in which the bolt 51 of the first fixing part 50 is disposed is formed on the positioning groove 36b. The bolt 51 passes through a through-hole, which is not illustrated, provided on the positioning part 21a of the pressure transmission part 21 on the positioning groove 36b. Thus, the pressure transmission part 21 is positioned.

A second groove 37 is formed further radially inward than the annular grooves 36a in the second blocking part 33. The second groove 37, as illustrated in FIG. 4, is formed deeper than the annular grooves 36a and forms a space allowing the downward displacement of the pressure transmission part 21. The opening part 33a is formed on the bottom surface of the second groove 37, and a corrosive fluid 100 from outside flows in.

A female screw is formed on the opening part 33a and a protective cap 70 is mounted thereto. The protective cap 70 has a male screw 71 screwed to the opening part 33a, a communication hole 72 formed inside the male screw 71 and communicating with the second groove 37, and a plurality of small holes 73 communicating with the communication hole 72. The corrosive fluid 100 from outside flows into the second groove 37 through the plurality of small holes 73 and the communication hole 72.

The protective cap 70 is mounted to the second blocking part 33 and protects the pressure transmission part 21. On the other hand, the protective cap 12 described above (see FIG. 1 and FIG. 2) is not mounted to the water level indicator 10, and instead, a spacer 80 for avoiding collision with the body part 31 is mounted thereto.

A mounting part 15 having a female screw 15a formed thereon is provided at the lower end of the water level indicator 10. The spacer 80 includes a male screw 81 screwed to the female screw 15a of the mounting part 15.

Note that the protective cap 70 may be mounted to the mounting part 15. In other words, the protective cap 70 may be mounted to the water level indicator 10 in the same manner as the protective cap 12 described above. Thus, the protective caps 12 and 70 do not need to be created separately, and control becomes simple.

Figure 6:
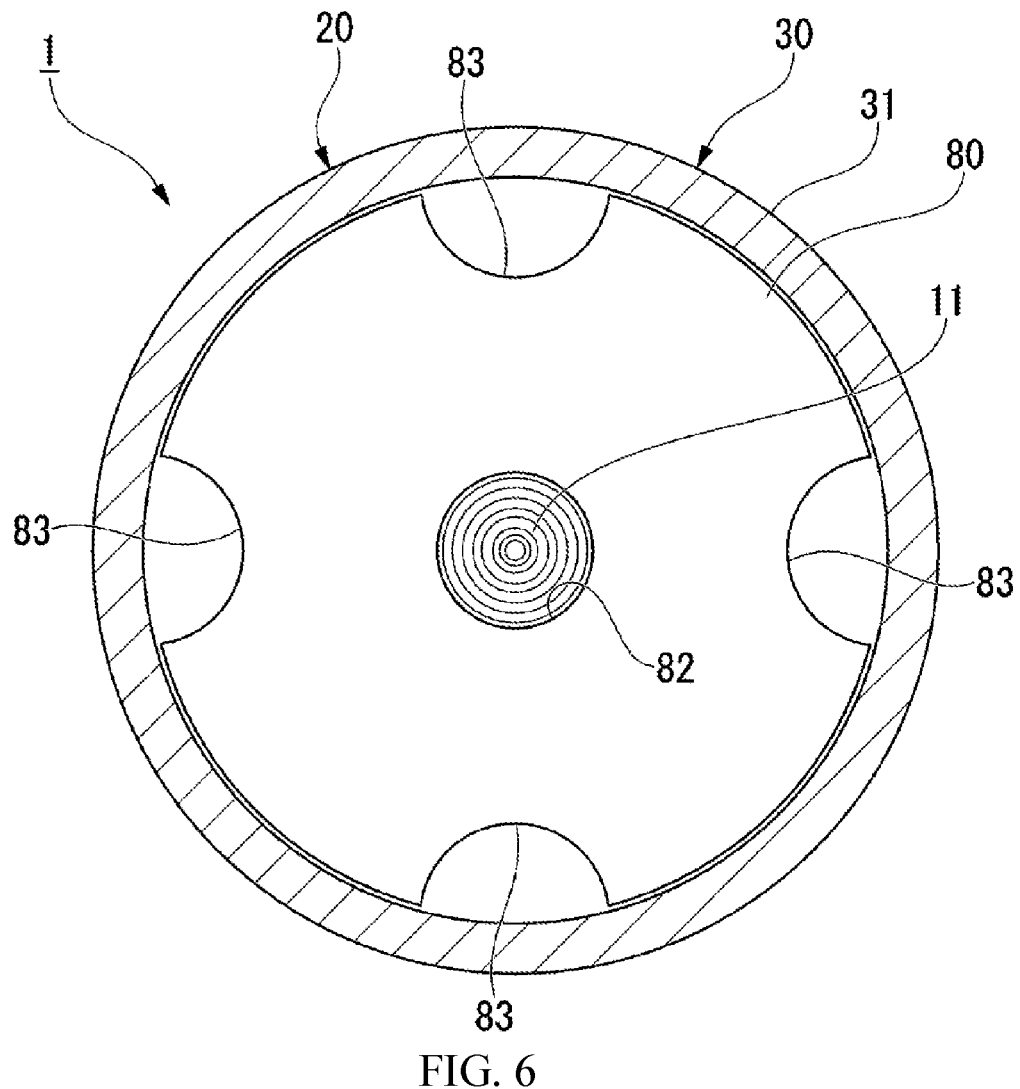
FIG. 6 is a bottom view of a spacer according to one or more embodiments.

FIG. 6 is a bottom view of the spacer 80 according to one example.

As illustrated in FIG. 6, an opening part 82 by which the pressure measuring part 11 is exposed is formed at a center portion of the spacer 80. The spacer 80 is formed substantially disc-shaped and its outer circumference is close to the inner wall surface of the body part 31.

A groove 83 through which the incompressible fluid 101 is passed through vertically is formed on the outer circumferential edge of the spacer 80. The groove 83 is formed in plurality at intervals in the circumferential direction at the outer circumferential edge of the spacer 80. Note that a plurality of holes may also be formed on the spacer 80 instead of the groove 83.

According to one example having the foregoing configuration, as illustrated in FIG. 4, and similar to the embodiments described above, the water level indicator 10 contacts only the incompressible fluid 101 which does not corrode a metal, such as water or silicone oil, and the pressure outside of the protective cover 20 is introduced through the pressure transmission part 21. Therefore, the water level indicator 10 is not affected by corrosion or organism adhesion. Accordingly, it is possible to cope with corrosive fluid and removal of attached matter is facilitated.

Furthermore, as illustrated in FIG. 4, the protective cap 70 for protecting the pressure transmission part 21 is mounted to the second blocking part 33. Thus, the pressure transmission part 21 may be prevented from being broken or damaged due to making contact with floating matter outside.

Furthermore, the spacer 80 for avoiding collision with the body part 31 is mounted to the water level indicator 10. Therefore, even if the water level indicator including a protective cover 1 is rocked to a large degree by waves or the like, the water level indicator 10 may be prevented from being damaged by colliding with the body part 31 inside the protective cover 20.

Furthermore, the groove 83 through which the incompressible fluid 101 is passed through is formed on the spacer 80, as illustrated in FIG. 4 and FIG. 6. Therefore, installing on the spacer 80 may prevent the flow of the incompressible fluid 101 inside the protective cover 20 from being inhibited.

One or more embodiments of the present invention have been described above while referring to drawings, but the present invention is not limited to the foregoing embodiments. The various shapes, combinations, and the like of each component illustrated in the embodiments described above are examples and may be changed in various ways based on design requests or the like within a range that does not deviate from the main gist of the present invention.

For example, in the foregoing embodiments, a configuration was described wherein the protective cover 20 is formed by the case 30 and the pressure transmission part 21 (diaphragm or bellows), but it is not limited to this configuration.

For example, there may be no hard case 30, the entire protective cover 20 may be configured of a soft material such as rubber or elastomer, and it may have a configuration surrounding the water level indicator 10. In other words, the entire protective cover 20 may be the pressure transmission part 21.

Furthermore, when the protective cover 20 is configured of a flexible material and is closely adhered to the pressure measuring part 11, the inside of the protective cover 20 need not be filled using the incompressible fluid 101.

Furthermore, for example, the case 30 may be made of metal rather than resin.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

1 Level indicator with cover
10 Water level indicator
13 Cable
20 Protective cover
21 Pressure transmission part
30 Case
31 Body part
32 First blocking part
33 Second blocking part
70 Protective cap
80 Spacer
83 Groove
101 Incompressible fluid

What is claimed is:

1. A level indicator that measures a water level, comprising:
  a water level indicator having a first diaphragm that measures pressure;
  a protective cover that surrounds the water level indicator and that comprises a second diaphragm that transmits pressure on an outside of the protective cover to an inside of the protective cover; and
  an incompressible fluid that is filled in a space inside of the protective cover and outside of the water level indicator, wherein
  the protective cover comprises:
    a cylindrical body part that surrounds the water level indicator;
    a first blocking part that blocks a first end of the cylindrical body part;
    a flange disposed at a second end of the cylindrical body part; and
    a second blocking part opposed to the flange and that blocks the second end, wherein
  the flange and the second blocking part are separate components of the protective cover,
  the flange is detachably fixed to the second blocking part in a state where the second diaphragm is interposed and sandwiched between the flange and the second blocking part such that the incompressible fluid is sealed in the space, the second diaphragm being detachable from the protective cover by detaching the second blocking part from the flange,
  the second blocking part comprises:
    an opening part by which the second diaphragm is exposed, the opening part being disposed at a center of the second blocking part, and
  the level indicator further comprises:
    a spacer mounted to the water level indicator and that prevents the water level indicator from colliding with the cylindrical body part, wherein the spacer is a disc having an outer circumferential along an inner wall of the cylindrical body part and has a groove or a hole through which fluid passes.

2. The level indicator according to claim 1, wherein:
the protective cover comprises a case that surrounds the water level indicator, and
the second diaphragm is softer than the case.

3. The level indicator according to claim 2, wherein the case is made of resin.

4. The level indicator according to claim 2, wherein the case comprises:
the cylindrical body part;
the first blocking part through which a cable connected to the water level indicator passes; and
the second blocking part, wherein
the second diaphragm is attached to the second blocking part.

5. The level indicator according to claim 4, further comprising:
a protective cap mounted to the second blocking part.

6. The level indicator according to claim 3, wherein the case comprises:
the cylindrical body part;
the first blocking part through which a cable connected to the water level indicator passes; and
the second blocking part, wherein
the second diaphragm is attached to the second blocking part.

7. The level indicator according to claim 6, further comprising:
a protective cap mounted to the second blocking part.

8. The level indicator according to claim 1, wherein
the second blocking part comprises annular grooves in each of which a seal ring is disposed, and
the seal ring adheres to the second diaphragm and seals a gap between the flange and the second blocking part.

\* \* \* \* \*